United States Patent [19]

Covington et al.

[11] Patent Number: 5,203,253
[45] Date of Patent: Apr. 20, 1993

[54] AUTOMATIC AIR COOKING SYSTEM FOR VENDING MACHINES

[75] Inventors: Wayne L. Covington, Boise, Id.; Glen R. Green, St. George, Utah

[73] Assignee: Ore-Ida Foods, Inc., Boise, Id.

[21] Appl. No.: 855,927

[22] Filed: Mar. 24, 1992

Related U.S. Application Data

[63] Continuation-in-part of Ser. No. 594,382, Oct. 9, 1990, Pat. No. 5,097,754.

[51] Int. Cl.$^5$ ............................................. A47J 37/04
[52] U.S. Cl. ....................................... 99/357; 99/427; 99/476
[58] Field of Search ................. 99/407, 348, 409, 418, 99/427, 443 R, 447, 449, 450, 467, 473, 474, 476, 483, 357, 403, 408; 219/389, 399, 400; 126/21 A; 392/379

[56] References Cited

U.S. PATENT DOCUMENTS

| | | |
|---|---|---|
| 1,649,488 | 11/1927 | Robinson et al. ............... 99/474 |
| 2,640,414 | 6/1953 | Jensen ............................... 99/476 |
| 3,643,404 | 2/1972 | Ronning ........................ 99/646 LS |
| 3,762,394 | 10/1973 | Newcomer ..................... 99/403 |
| 3,943,841 | 3/1976 | Huang .............................. 99/470 |
| 4,155,294 | 5/1979 | Langhammer et al. ......... 99/427 |
| 4,203,358 | 5/1980 | Vogt ................................ 99/427 |
| 4,421,018 | 12/1983 | Pryputsch et al. ............ 126/21 A |
| 4,503,760 | 3/1985 | Pryputsch et al. .............. 99/476 |
| 4,763,572 | 8/1988 | Kuehl .............................. 99/483 |
| 4,854,949 | 8/1989 | Giles, Sr. et al. .............. 99/403 |

Primary Examiner—Timothy F. Simone
Attorney, Agent, or Firm—Burns, Doane, Swecker & Mathis

[57] ABSTRACT

A closed-loop air cooking system includes: a) a closed-loop air duct assembly; b) a cooking basket means mounted for rotation within the air duct assembly; c) fan means for forcing air through the air duct assembly; d) heating means for heating air that circulates within the air duct assembly; and e) separator means for removing entrained particulates from the air stream that circulates within the air duct assembly.

14 Claims, 4 Drawing Sheets

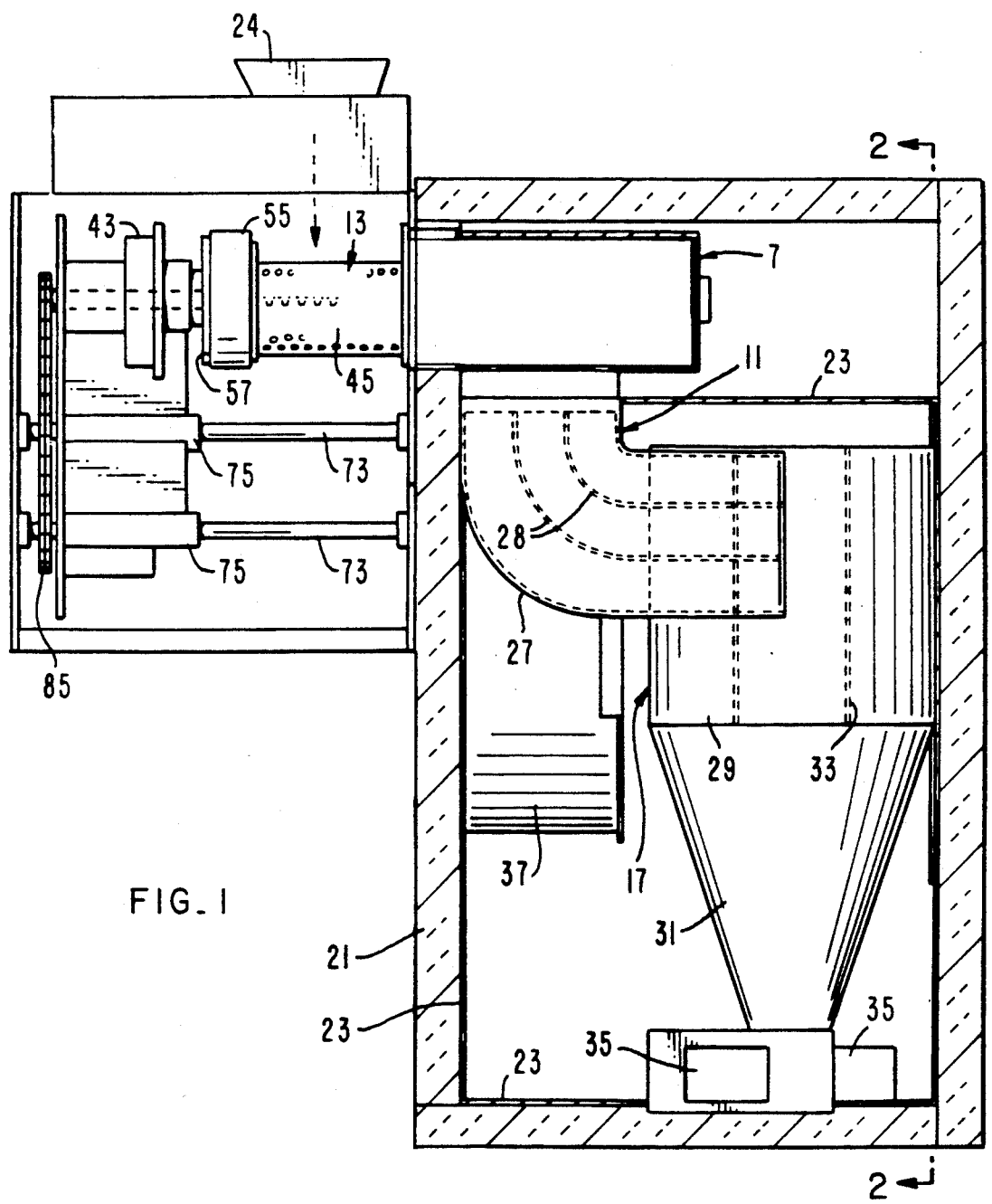
FIG_1

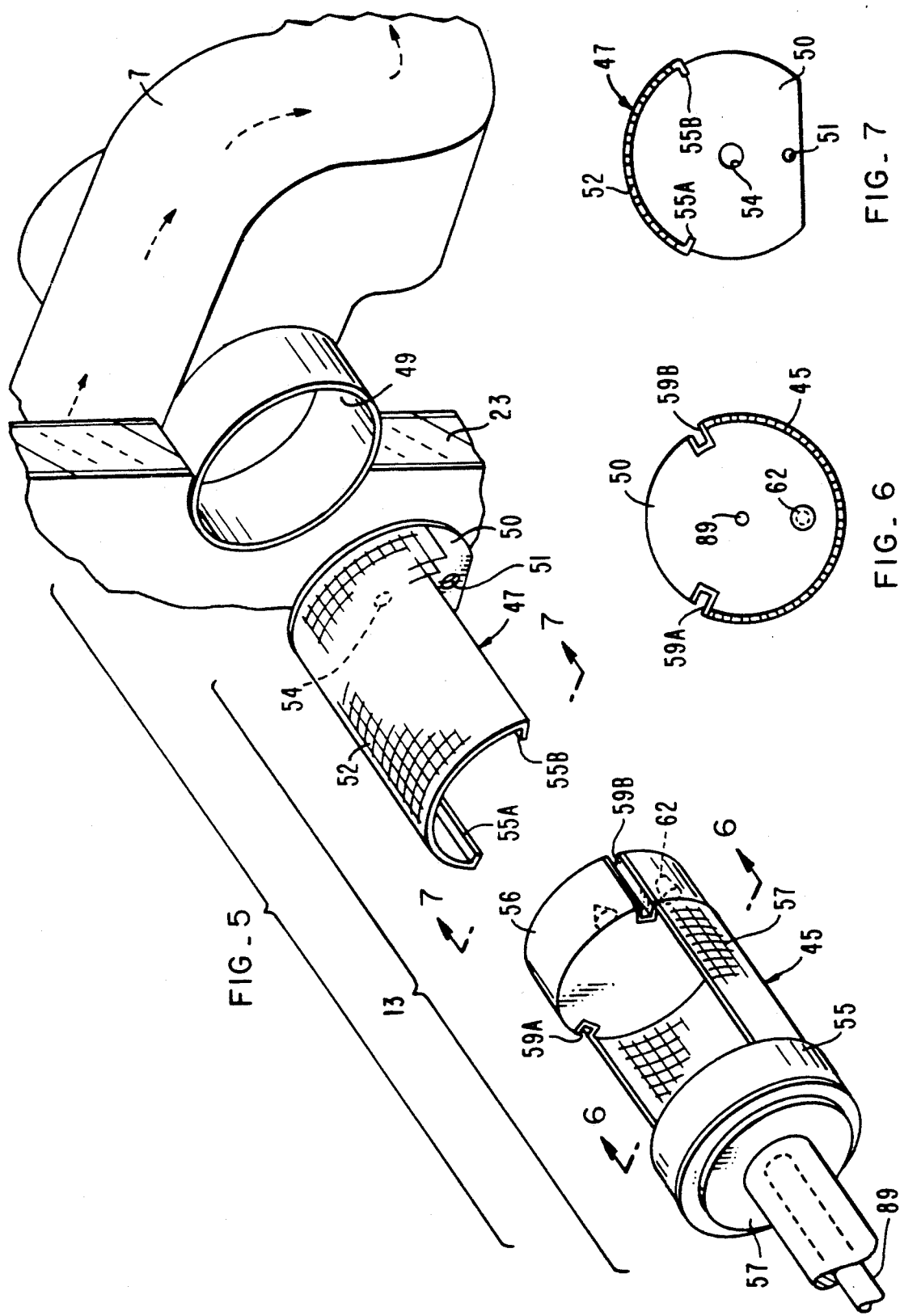

AUTOMATIC AIR COOKING SYSTEM FOR VENDING MACHINES

Related Applications

The present application is a continuation-in-part of commonly-assigned U.S. Pat. application Ser. No. 07/594,382, filed Oct. 9, 1990, which will issue on Mar. 24, 19992, as U.S. Pat. No. 5,097,754 for Automatic Air Cooking Systems for Vending Machines, the entire disclosure of which is hereby incorporated by reference herein.

FIELD OF THE INVENTION

1. Field of the Invention

The present invention generally relates to cooking systems and, more particularly, to cooking systems that can be used in vending machines.

2. State of the Art

Various cooking systems have been proposed for use in machines that vend cooked foods. Those cooking systems typically include an energy source, such as an infrared source or a microwave energy source, that provides thermal energy for heating a cooking medium such as hot oil or hot air. In practice, the proposed cooking systems have had serious shortcomings, including the production of strong, burnt odors during normal operation. Further, many of the systems required prolonged cooking periods. Also, many of the systems produce cooked food products that were not cooked uniformly.

SUMMARY OF THE INVENTION

Generally speaking, the present invention provides a closed-loop air cooking system. The closed-loop air cooking system can be used, for example, in vending machines that vend french fried potatoes and the like. In the preferred embodiment, the closed-loop air cooking system of the present invention includes the following major components: a) a closed-loop air duct assembly; b) a cooking basket means mounted for rotation within the air duct assembly; c) fan means for forcing air through the air duct assembly; d) heating means for heating air that circulates within the air duct assembly; and e) separator means for removing entrained particulates from the air stream that circulates within the air duct assembly. In operation, the separator means operates to remove oil and other particulates from the closed-loop air stream and, particularly, prevents particulates from reaching the heating system, thereby minimizing cooking odors. In addition, the separator means providing a thermal mass that can absorb heat from, and can provide heat to, the circulating air stream.

In operation of the closed-loop air cooking system, the basket assembly is filled with a serving portion of french fried potatoes or the like, and rotated in the heated air stream for a predetermined period at a generally constant rotational speed (e.g., twenty revolutions per minute) to uniformly expose the serving portion to the heated air stream. The air velocity impinging upon the serving portion during the cooking cycle is controlled at about 2200 ft/min with a volumetric flow rate of about 378 cubic feet per minute (cfm) at about 455 to 465 degrees Fahrenheit to promote rapid cooking without smoking. At the air velocity of about 2200 ft/min, french fried potatoes cook to have delicate and crisp outer layers with moistly hot interiors. Also, the air velocity of about 2200 ft/min is sufficient to entrain loose oil from the fried potatoes, leaving them essentially dry to the touch.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a side view of a closed-loop air cooking system according to the present invention, with various components removed for purposes of illustration;

FIG. 5 is an exploded pictorial view of the rotary cooking basket assembly; and

FIGS. 6 and 7 are cross-sectional details of the rotary cooking basket assembly.

DETAILED DESCRIPTION OF THE PREFERRED EMBODIMENTS

Figure 3:
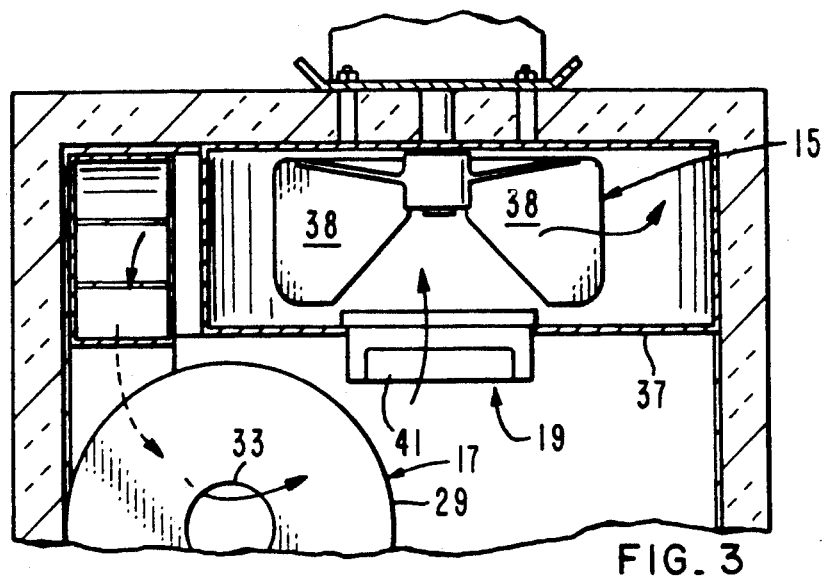
FIG. 3 is a partial top view, taken along the plane of the line 3—3 in FIG. 1 for viewing in the direction of the arrows.
Figure 2:
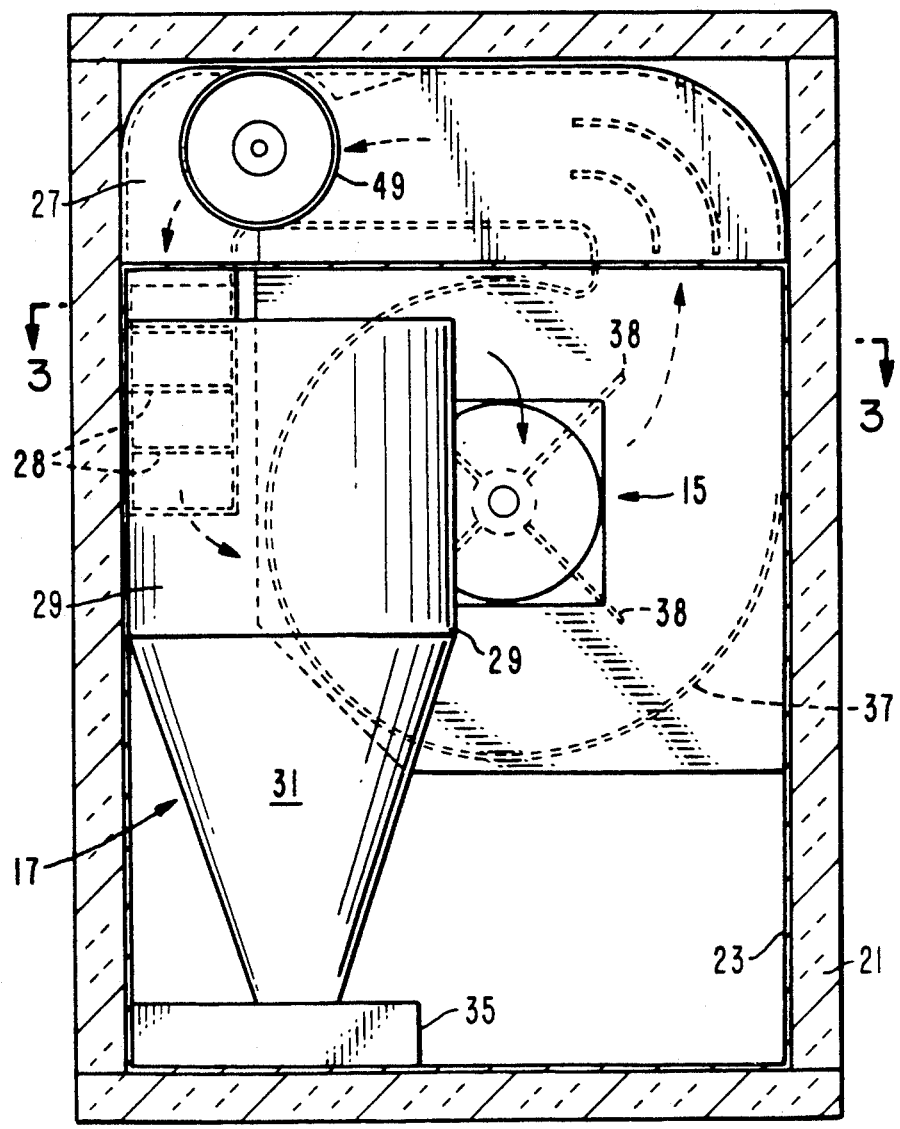
FIG. 2 is an end view of the closed-loop air cooking system of FIG. 1, again with various components removed for purposes of illustration.

FIGS. 1-3 show the major components of a closed-loop air cooking system that can be used in machines that vend cooked food products such as french fried potatoes and the like. One of the key components in the cooking system is a rotary cooking basket assembly 13 which is mounted for selective insertion into, and withdrawal from, a duct section 7 which is one portion of an air duct assembly 11. Further, the system includes a fan 15 which is interposed in the air duct assembly for forcing air through it. Still further, the system includes a separator device 17 which is connected to the duct assembly for removing particulates from the circulating air stream. Also, the system includes an electrical heater 19 which is mounted in communication with the air duct assembly 11 for heating the circulating air stream. Finally, the system includes a housing 23 which surrounds the air duct assembly and supports insulation material 21.

In practice, the electrical heating elements of the heater 19 are mounted adjacent the inlet to fan 15, and the outlet of the fan is connected to the duct section 7. The purpose of mounting the heater at the fan inlet is to provide uniform mixing of the heated air stream before the air stream encounters the rotary cooking basket assembly. This is done to enhance the uniformity with which food is cooked by the cooking system.

In normal operation, as will be explained further below, the heater 19 heats the circulating air stream to approximately about 455° to 465° F. The heater 19, however, preferably has sufficient additional capacity to elevate the temperature of the circulating air stream to approximately 800° F. for periods as long as one hour. This capability allows the closed-loop air cooking system to be self-cleaning.

As best shown in FIGS. 2 and 3, the fan 15 includes a shroud 37 and a rotary fan blade assembly 38. The fan 15 is interposed in a section of the duct assembly 11 that extends between the separator outlet member 33 and the rotary cooking basket assembly 13. In operation, the fan 15 receives cleaned air from the separator outlet member 33 and then drives that air through the cooking basket assembly 13.

In the preferred embodiment, the closed-loop air cooking system of FIGS. 1-3 is used in a vending machine. In such usage, the closed-loop air cooking system is connected, as by chute or hopper 24, for receiving metered portions of a frozen food product from a storage freezer (not shown). The frozen product, as mentioned above, typically is french fried potatoes. In practice, the french fried potatoes are at least partially pre-cooked and then frozen. The pre-cooking is done to minimize the time required by the closed-loop air cooking system to complete the cooking process. Furthermore, precooking allows the food products to be cooked a different medium than hot air. For example, in the case of french fried potatoes, pre-cooking can be done in hot oil.

In the embodiment shown in FIGS. 1-3, the separator device 17 is a cyclone separator. As such, the separator device 17 includes an inlet member 27, a generally cylindrical body 29 that receives the inlet member, and a frustro-conical member 31 that connects to the lower periphery of the cylindrical body 29. In the illustrated embodiment, turning vanes 28 in the inlet member 27 direct air into the cylindrical body member 29 in a swirling pattern.

As further shown in FIG. 3, the cyclone separator includes a cylindrically-shaped outlet member 33 that connects between the duct assembly 11 and the interior of the cylindrical body 29 for discharging cleaned air from the cyclone separator. It should be noted that the circulating air stream enters the cyclone separator 17 after passing through the rotary cooking basket assembly. It should also be noted that the flowing air stream, with particulates removed, is discharged from the separator device 17 via the outlet member 33 for reentry into the duct assembly 11. In practice, the cyclone separator is made from sheet metal.

The separator device 17, generally speaking, operates to remove contaminants from the air stream that circulates within the duct assembly 11. Typically, the contaminates are oil vapor or carbonized particulates that are introduced into the heated air stream as it passes through the rotary cooking basket assembly. Thus, the separator device 17 prevents particulate contaminants from being carried by the air stream back through the electrical heater, where the contaminants might crate burning or smoking odors.

More particularly, in operation of the separator device 17, the centrifugal force of the air swirling in the cylindrical body member 29 causes entrained particulates to impinge upon the interior peripheral wall of the separator. (As mentioned above, the turning vanes 28 in the inlet member 27 assist in establishing and maintaining a swirling pattern in the cylindrical body member 29.) The particulates carried by the swirling air mass, after impingement on the wall, drop downward and collect in the frustro-conical member 31.

Preferably, a secondary clean out scroll 35 is mounted at the bottom of the conical section 31. The secondary scroll 35, in operation, assists in removing particulates from the main air stream and for collecting the particulates for manual clean out. In practice, the collected particulates are periodically removed from the secondary scroll 31 via a discharge outlet 36.

The separator device 17 also provides a thermal mass that can absorb heat from, or can provide heat to, the circulating air stream. In the later case, the separator device 17 provides a heat reservoir that can act as a source of nearly instantaneous thermal energy. The walls of the separator device receive heat by radiant absorption from the heating elements and from the circulating air mass. centrifugal separator, thereby providing radiant heating of the air mass circulating through the system and, as such, serves as a heat sink and provides a source of instantaneous thermal energy.

In practice, the separator device 17 can supply a substantial portion of the required cooking heat when batches of frozen food products are cooked fairly frequently. This allows frozen food products to be cooked rapidly—because pre-heating time is not required. For example, batches of french fried potatoes are periodically cooked in the closed-loop air cooking system with a frequency as every thirty seconds. If the separator device were not available as a source of thermal energy, the cooking cycles would not be a frequent or, alternatively, the electrical heater 19 would have to have a larger capacity for heating the circulating air.

Not only does the separator device 17 provide a source of nearly instantaneous thermal energy but, after a few consecutive cooking cycles, the body of the separator device becomes sufficiently hot to burn oil vapor that are carried by the air stream that circulates within the duct assembly 11. More particularly, when the vapors impinge upon the wall of the separator device, the burnt vapors form a solid residue on the housing wall. As a result, the oil vapors are effectively removed from the circulating air stream, allowing the system to produce cooked food products, such as french fried potatoes, without undue external oiliness.

Figure 4:
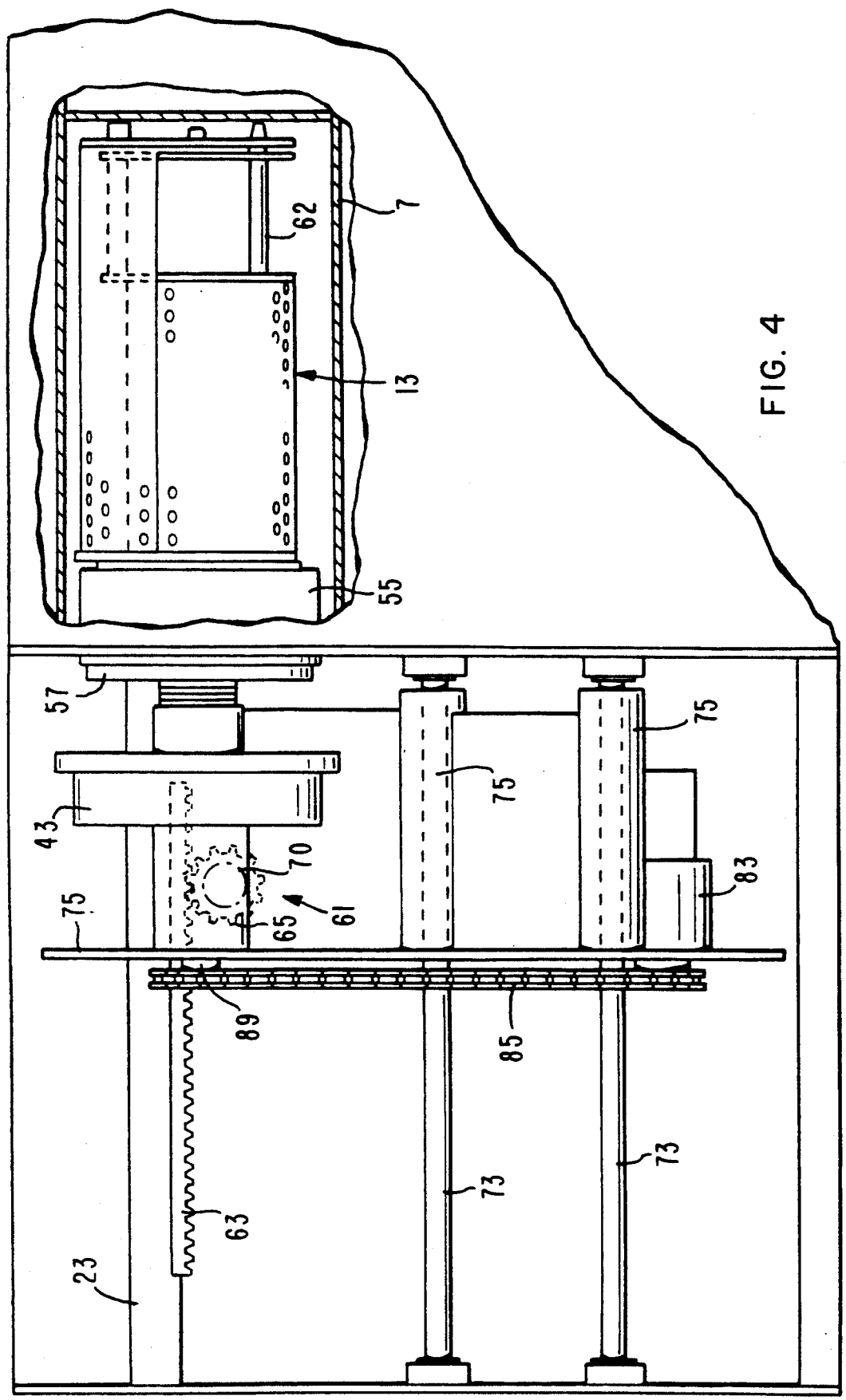
FIG. 4 is a side elevation, partially cut away, showing the rotary cooking basket assembly of FIG. 1 (enlarged scale) in a second position.

As shown in FIGS. 4-6, the rotary cooking basket assembly 13 includes a lower basket assembly 45 and a cover assembly 47. The cover assembly 47 includes a circular end plate 50 and an approximately semi-cylindrical portion 52 which is constructed from an open mesh material. It may be noted that the circular end plate 50 has a central aperture 54 and an off-center aperture 51. It should also be noted that the semi-cylindrical portion 52 includes flange members 55A and 55B that extend inwardly along its longitudinally-extending edges. (The flange members 55A and 55B, and the off-center aperture 51 are also shown in FIG. 7.)

The lower basekt assembly 45, as shown in FIG. 5, includes a pair of circular end plates 55 and 56 and an approximately semi-cylindrical basket portion 57 connected between the end plates. The basket portion 57, as shown, is constructed from an open mesh material. It should be noted that the circular end plate 56 has longitudinally-extending grooves 59A and 59B formed therein. The grooves 59A and 59B are located for receiving the inwardly-extending flange members 55A and 55B, respectively. It should be noted that the circular end plate 56 includes a locating pin 62 that extends from the end of the plate. (As will be explained further below, the locating pin 62 engages the off-center aperture 51 when the upper and lower sections of the rotary cooking basket are assembled.)

In ordinary usage of the cooking basket assembly 13, the cover assembly 47 is mounted for retention within the duct assembly, but the lower basket assembly 45 is movable, in a longitudinal direction, in and out of the duct section. When the lower basket assembly 45 is inserted into the duct assembly, it mates with the cover assembly 47 to provide a closed container that has an cylindrical shape. As will be explained further below, both the lower basket assembly 45 and the cover assembly 47 are rotatable about their axial centerline. In particular, the cover assembly 47 is mounted for rotation about a pin member which extends through the central aperture 54 in the circular end plate 50.

The rotary cooking basket 13, as shown, is largely constructed from an open mesh material that allows air to flow relatively freely through the basket. In practice, design of the basket is such that the pressure drop of air flowing through the basket ordinarily does not exceed about 1.25 inches of $H_2O$.

As also shown in FIG. 5, a cylindrical sleeve 49 is mounted to the duct section 7 for receiving the rotary cooking basket assembly 13. The sleeve 49 is located such that the axial centerline of the basket assembly 13 extends transverse to the general direction of air flow through the duct section. The cross-sectional dimension of the duct section normally is selected such that substantially all of the air flowing through the duct section is forced to pass through the basket assembly 13. This is done for purposes of efficiency and for enhancing the uniformity with which food is cooked by the cooking system.

As further shown in FIG. 5, an annular seal member 58 is mounted on shaft 89 to extend radially outward from the circular end plate 55. The annular seal member 58 has approximately the same diameter as the sleeve 49 and is designed for sealing against the cylindrical sleeve 49. This seal provides thermal insulation and reduces the loss of heated air while foods are being cooked in the closed-loop system. That is, the annular seal member prevents outgassing of smoke or water vapor from products during cooking. In practice, the annular seal member 58 is a silicone rubber gasket and is held against the end plate 56 by an annular plate 60.

Referring again to FIG. 4, it can be seen that cover member 43 is axially mounted on the shaft 89 for further sealing around the cylindrical sleeve 49. The cover member provides additional thermal insulation and further reduces the loss of heated air while foods are being cooked in the closed-loop system. In operation, the cover member 43 is moved axially back and forth toward the sleeve 49 by a reciprocating mechanism such as will now be explained.

Referring still to FIG. 4, it also can be seen that a reciprocating mechanism, generally designated by the number 61, is provided for moving the lower basket assembly 45 into and out of the air duct assembly 11. As illustrated, the reciprocating mechanism 61 includes three primary components: a) a linear gear member 63 which is fixed to the housing 23 and which extends in the direction of travel of the lower basket 45, b) a rotatable pinion gear 65 which is attached to the lower basket and which engages the linear gear; and a drive means, illustrated as a chain member 69 and a drive motor 70, for selectively rotating the pinion gear 65.

As further shown in FIG. 4, a pair of guide rods 73 are mounted to a structural member of the housing 23 to extend in a direction parallel to the direction of travel of the lower basket 45. A pair of sleeve members 75 are mounted to slide on respective ones of the guide rods. The lower basket 45 is connected to the sleeve members by a rigid plate 75.

In operation of the reciprocating mechanism 61, the lower basket 45 is selectively moved into or out of the air duct assembly 11 by rotation of the motor 70. More particularly, rotation of the motor 70 drives the chain 69 which, in turn, rotates the pinion gear 65. As the pinion gear rotates, it travels along the linear gear member 63 and, thereby, moves the cooking basket assembly back and forth. The motion of the basket is guided by the sleeve members 75 sliding on the guide rods 73. As the reciprocating mechanism 61 moves the lower basket 45 into the cylindrical duct sleeve 49 the cover assembly 47 slides onto the lower section until the lower basket is completely covered.

As still further shown in FIG. 4, a rotary drive mechanism 81 is provided for selectively rotating the basket assembly 13. In the illustrated embodiment, the rotary drive mechanism includes an electric motor 83 which is connected, via a drive chain 85, to a shaft 89 which is connected to the basket assembly. The shaft 89 extends in the direction of the axial centerline of the basket assembly and is connected for rotating the lower basket. (As will be described further below, complete rotation of the basket assembly occurs during cooking, and partial rotation occurs when serving portions are loaded into, or discharged from, from the basket assembly.)

Complete operation of the rotary cooking basket assembly will now be described. Initially, it can be assumed that the basket assembly 13 has been filled with a pre-measured portion of a frozen food product via the chute 24. It also can be assumed initially that the lower basket assembly 45 and the cover assembly 47 have been mated together to form a cylindrical enclosure. At that time, the rotary cooking basket assembly is rotated in the heated air stream for a predetermined period to uniformly expose the food to the impinging air stream. Rotation of the cooking basket assembly is driven by the rotary drive mechanism 81. More particularly, the electric motor 83 selectively drives the drive chain 85 which, in turn, rotates the shaft 89 which turns the rotary cooking basket assembly. In practice, the rotation speed of the cooking basket assembly is generally constant (e.g., twenty revolutions per minute). Also in practice, the air velocity impinging upon the food during the cooking cycle is controlled at about 2200 ft/min with a volumetric flow rate of about 378 cubic feet per minute (cfm) at about 455° to 465° F. to promote rapid cooking without smoking.

At the air velocity of about 2200 ft/min, it has been found that french fried potatoes will cook to have delicate and crisp outer layers with moistly hot interiors. In practice, it also has been found that the air velocity of about 2200 ft/min is sufficient to entrain loose oil from the fried potatoes during cooking, leaving the cooked product essentially dry to the touch.

After the cooking cycle is completed, reciprocating mechanism 61 is actuated to withdraw the lower basket from the duct section. (The reciprocating mechanism operates as described above.) As lower basket 45 is removed from the cylindrical sleeve 49, the basket cover assembly 47 remains attached within in the duct assembly.

Then, after the lower basket 45 is withdrawn to a position outside of the cylindrical sleeve 49, the basket is partially rotated to an inverted position. Upon inversion, the cooked food product is discharged into a dispensing cup or the like. Then, the lower basket is returned to its non-inverted position. After the lower basket is in its non-inverted position, it can be loaded with another serving portion of pre-frozen food product.

After loading, the lower basket 45 is inserted into the cylindrical sleeve 49 at an angular orientation (i.e., upright) for mating with the basket cover assembly 47. Thereafter, the basket assembly can be fully rotated without discharging food.

In typical operation of the system, the fan 15 is operated between cooking cycles, to keep air circulating within the system. Also in typical operation of the system, electrical current is provided to heat the heating elements 41 sufficiently that the temperature of the circulating air is maintained at the cooking temperature (i.e., approximately 450 F.). Then, when the basket assembly is filled with a serving portion of frozen food and is rotated in the heated air stream, the separator means provides a thermal mass that provide heat to the circulating air stream to, thereby, minimize the cooking time that would otherwise be required.

Also because the separator device 17 is maintained at cooking temperatures, it acts as a plating device to take oil out of the airstream. More particularly, plate-out of oil vapor builds inside of the separator body 29 until the plated solids are removed during the above-described self-cleaning process. At the high temperatures that are generated during self-cleaning, the plated-out solids break off, flake off, or are burned off the walls of the separator body. The net result is that the oil vapors are removed from the airstream.

At this juncture, it should be noted that the above-described closed-loop air cooking system obviates the need for a hot oil reservoir and its attendant difficulties. As such, the cooking system delivers french fried potatoes that have tender but crisp exteriors, uniformly hot interiors that taste like famous Idaho baked potatoes. Moreover, the french fried potatoes have a uniform and pleasing color, and no external oiliness.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A closed-loop air cooking system for cooking frozen foods comprising:
   a closed-loop air duct assembly;
   a cooking basket means mounted for rotation within the air duct assembly;
   fan means for forcing air through the air duct assembly;
   heating means for heating air that circulates within the air duct assembly; and
   a separator means mounted for removing entrained particulates from the air stream that circulates within the air duct assembly, the separator means providing a thermal mass that can absorb heat from, and can provide heat to, the circulating air stream.

2. A system according to claim 1 wherein in the separator means is a cyclone separator.

3. A system according to claim 1 wherein in the cyclone separator includes an inlet scroll member for receiving the air stream from the duct assembly, a generally cylindrical body member for receiving air flow from the scroll member and allowing the air stream to circulate in a swirling pattern so that heavier particulates in the flow impinge upon the peripheral wall of the body member, a frustro-conical member communicating with the lower part of the cylindrical body member for gravity discharge of the heavier fraction of materials from the separator, and an inner cylindrical outlet member communicating with the lower part of the cylindrical body member for discharging the main air stream from the separator.

4. A system according to claim 1 wherein in the fan means is mounted for receiving the air stream after particulates have been removed therefrom by the separator means.

5. A system according to claim 1 wherein electrical heating elements are mounted with the interior of separator means near the inlet to fan means.

6. A system according to claim 5 wherein electrical heating elements are mounted with the interior of separator means near the inlet to fan means.

7. A system according to claim 6 wherein electrical heating elements allow the temperature to be elevated to approximately 800° Fahrenheit for sufficient time that the system is self-cleaning.

8. A system according to claim 1 wherein the cooking basket means is mounted to travel into and out of the air duct assembly.

9. A system according to claim 8 wherein the cooking basket means comprises a lower basket portion and a basket cover assembly.

10. A system according to claim 9 wherein the cooking basket means has an overall cylindrical shape and is constructed from an open mesh material.

11. A system according to claim 9 wherein the cooking basket means provides pressure drop of air flowing through the assembly below about 1.25" $H_2O$.

12. A system according to claim 8 further including an open-ended cylindrical member connected to the duct assembly for receiving the cooking basket means.

13. A system according to claim 12 wherein the basket assembly includes a circular end member and an annular seal member mounted to surround the end member for sealing against the open ended cylindrical member for providing thermal insulation and for reducing air loss from the cooking system during normal operation.

14. A system according to claim 12 wherein the basket assembly is movable in and out of the duct section, while the cover assembly is mounted to be retained within the duct section.

* * * * *

UNITED STATES PATENT AND TRADEMARK OFFICE
CERTIFICATE OF CORRECTION

PATENT NO. : 5,203,253
DATED : April 20, 1993
INVENTOR(S) : Covington, Wayne L.

It is certified that error appears in the above-identified patent and that said Letters Patent is hereby corrected as shown below:

Column 1, --BACKGROUND OF THE INVENTION-- should follow the title of the application.

Column 1, line 9, delete [19992] and insert --1992--.

Column 2, line 18, delete [FIG. 1] and insert --FIG. 2--.

Column 4, line 8, delete [centrifigal] and insert -- Centrifugal--.

Column 4, line 28, delete [are] and insert --is--.

Signed and Sealed this

Twenty-fifth Day of January, 1994

Attest:

BRUCE LEHMAN

Attesting Officer     *Commissioner of Patents and Trademarks*